United States Patent
Gaede et al.

(10) Patent No.: US 9,280,515 B2
(45) Date of Patent: Mar. 8, 2016

(54) PROVISION OF ALTERNATE CONTENT IN RESPONSE TO QR CODE

(75) Inventors: Jason Gaede, Denver, CO (US); Germar Schaefer, Monument, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 87 days.

(21) Appl. No.: 12/960,285

(22) Filed: Dec. 3, 2010

(65) Prior Publication Data

US 2012/0138671 A1 Jun. 7, 2012

(51) Int. Cl.
| | |
|---|---|
| *G06F 17/00* | (2006.01) |
| *G06Q 20/32* | (2012.01) |
| *H04N 21/236* | (2011.01) |
| *H04N 21/2665* | (2011.01) |
| *H04N 21/4223* | (2011.01) |
| *H04N 21/4722* | (2011.01) |
| *H04N 21/658* | (2011.01) |
| *H04N 21/81* | (2011.01) |

(Continued)

(52) U.S. Cl.
CPC .......... *G06F 17/00* (2013.01); *G06F 17/30879* (2013.01); *G06Q 20/32* (2013.01); *H04N 21/236* (2013.01); *H04N 21/2665* (2013.01); *H04N 21/4223* (2013.01); *H04N 21/4722* (2013.01); *H04N 21/6581* (2013.01); *H04N 21/8126* (2013.01); *H04N 21/8352* (2013.01)

(58) Field of Classification Search
CPC ... G06Q 30/02; G06Q 10/00; G06Q 30/0236; G06Q 30/0601; G06Q 20/20; G06Q 30/0207; G06Q 30/0212; G06Q 30/0217; G06Q 30/0259; G06Q 30/0267; G06Q 10/10; G06Q 30/06; G06Q 20/3276; G06Q 10/08
USPC ................ 235/375, 462.01, 462.1; 705/14.55
See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |

(Continued)

FOREIGN PATENT DOCUMENTS

| | | |
|---|---|---|
| CA | 2 634 951 A1 | 1/2010 |
| CN | 1352765 A | 6/2002 |

(Continued)

OTHER PUBLICATIONS

Byford, D., "Universal Interactive Device," International Business Machines Corporation, Jun. 1998, 1 page.

(Continued)

*Primary Examiner* — Thien T Mai
(74) *Attorney, Agent, or Firm* — Kilpatrick Townsend & Stockton LLP

(57) ABSTRACT

A party that is not the source or originator of a QR code is enabled to provide a consumer a selection of related alternate content rather than content identified in the QR code. A method is implemented on a computer system to receive additional content information represented by a QR code extracted by a consumer's QR reader device from a media presentation containing the QR code. The QR code is generated by a source of the media presentation. A location of alternate content from a captive environment related to the additional content information is identified. The location of the alternate content may be identified based upon the decoded information from the QR code. The location of the alternate content is transmitted to the QR reader device.

21 Claims, 8 Drawing Sheets

(51) Int. Cl.
*H04N 21/8352* (2011.01)
*G06F 17/30* (2006.01)

(56) References Cited

U.S. PATENT DOCUMENTS

| | | | |
|---|---|---|---|
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,959,285 A | 9/1999 | Schuessler |
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 2001/0037297 A1 | 11/2001 | McNair |
| 2001/0052133 A1 | 12/2001 | Pack et al. |
| 2002/0011521 A1 | 1/2002 | Lahey et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 * | 3/2005 | Williams ..................... 705/26 |
| 2005/0059339 A1 | 3/2005 | Honda et al. |
| 2005/0097618 A1 | 5/2005 | Arling et al. |
| 2005/0107135 A1 | 5/2005 | Deeds et al. |
| 2005/0125301 A1 | 6/2005 | Muni |
| 2005/0149967 A1 | 7/2005 | Hanley et al. |
| 2005/0163483 A1 | 7/2005 | Rassool |
| 2005/0180804 A1 | 8/2005 | Andrew et al. |
| 2005/0203854 A1 | 9/2005 | Das |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0174198 A1 | 7/2007 | Kasahara et al. |
| 2007/0192723 A1 | 8/2007 | Anzelde et al. |
| 2007/0200335 A1 | 8/2007 | Tuschel |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |
| 2008/0281624 A1 | 11/2008 | Shibata |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |

(56) References Cited

U.S. PATENT DOCUMENTS

| | | |
|---|---|---|
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1* | 4/2009 | Mu et al. ............... 235/375 |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0234570 A1 | 9/2009 | Sever |
| 2009/0254954 A1 | 10/2009 | Jeong |
| 2009/0293110 A1 | 11/2009 | Koga |
| 2009/0294538 A1 | 12/2009 | Wihlborg et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007218 A1 | 1/2011 | Moran et al. |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1* | 10/2011 | Fitzpatrick et al. ........ 705/14.55 |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 101 227 581 A | 7/2008 |
| CN | 101253504 A | 8/2008 |
| CN | 101 409 027 A | 4/2009 |
| CN | 101 894 113 A | 11/2010 |
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |

(56) References Cited

FOREIGN PATENT DOCUMENTS

| | | |
|---|---|---|
| JP | 2002-215768 A | 8/2002 |
| JP | 2007-213548 A | 8/2007 |
| JP | 2008 244556 A | 10/2008 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 1/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2005/109338 A1 | 11/2005 |
| WO | 2007/009005 A1 | 1/2007 |
| WO | 2009/057651 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |
| WO | 01/58146 A2 | 8/2011 |

OTHER PUBLICATIONS

International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 201, Office Action mailed Jul. 18, 2012, 15 pages.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.conn/qr_barcode_technology.html, Oct. 22, 2010.
Kartina Costedio, "Bluefly QR Codes Debut on TV," 2 pp. Found online at http://www.barcode.com/Mobile-Barcode-News/bluefiy-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

(56) References Cited

OTHER PUBLICATIONS

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

Extended European Search Report for EP 12152690.9 dated Jun. 19, 2012, 9 pages.

International Search Report of PCT/US2012/022581 mailed on Oct. 8, 2012, 18 pages.

International Search Report and Written Opinion of PCT/US2012/026624 mailed Aug. 29, 2012, 14 pages.

International Search Report and Written Opinion of PCT/US2012/048032, mailed Oct. 16, 2012, 14 pages.

O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.

U.S. Appl. No. 12/958,073, filed Dec. 1, 2010, Office Action mailed Aug. 31, 2012, 12 pages.

U.S. Appl. No. 12/958,073, filed Dec. 1, 2010, Notice of Allowance mailed Jan. 17, 2013, 17 pages.

U.S. Appl. No. 12/961,369, filed Dec. 6, 2010, Final Rejection mailed Oct. 30, 2012, 17 pages.

U.S. Appl. No. 12/971,349, filed Dec. 7, 2010, Final Rejection mailed Oct. 24, 2012, 11 pages.

U.S. Appl. No. 12/981,244, filed Dec. 29, 2010, Office Action mailed Dec. 21, 2012, 23 pages.

U.S. Appl. No. 12/984,385, filed Jan. 4, 2011, Notice of Allowance mailed Nov. 28, 2012, 11 pages.

U.S. Appl. No. 12/953,227, filed Nov. 23, 2010, Office Action mailed Nov. 7, 2012, 31 pages.

U.S. Appl. No. 13/015,382, filed Jan. 27, 2011, Office Action Mailed Nov. 13, 2012, 7 pages.

U.S. Appl. No. 13/015,382, filed Jan. 27, 2011, Notice of Allowance mailed Feb. 22, 2013, 12 pages.

U.S. Appl. No. 13/016,483, filed Jan. 28, 2011 Office Action mailed Nov. 2, 2012, 18 pages.

U.S. Appl. No. 12/953,273, filed Nov. 23, 2010, Notice of Allowance, mailed Oct. 18, 2012, 11 pages.

U.S. Appl. No. 13/007,317, filed Jan. 14, 2011, Office action mailed Dec. 19, 2012, 29 pages.

U.S. Appl. No. 13/020,678, filed Feb. 3, 2011, Notice of Allowance mailed Jan. 3, 2013, 13 pages.

U.S. Appl. No. 13/028,030, filed Feb. 15, 2011, Office Action mailed Jan. 11, 2013, 14 pages.

U.S. Appl. No. 13/034,482, filed Feb. 24, 2011, Office Action mailed Oct. 19, 2012, 11 pages.

U.S. Appl. No. 13/035,474, filed Feb. 25, 2011, Office Action mailed Oct. 30, 2012, 11 pages.

U.S. Appl. No. 13/035,525, filed Feb. 25, 2011, Final Office Action mailed Jan. 31, 2013, 26 pages.

U.S. Appl. No. 13/037,302, filed Feb. 28, 2011 Office Action mailed Mar. 1, 2013, 20 pages.

U.S. Appl. No. 13/037,312, filed Feb. 28, 2011, Office Action mailed Aug. 15, 2012, 9 pages.

U.S. Appl. No. 13/037,312, filed Feb. 28, 2011, Final Office Action mailed Feb. 28, 2013, 18 pages.

U.S. Appl. No. 13/037,316, filed Feb. 28, 2011, Office Action mailed Jan. 30, 2013, 21 pages.

U.S. Appl. No. 13/037,333, filed Feb. 28, 2011 Notice of Allowance mailed Jan. 18, 2013, 27 pages.

U.S. Appl. No. 13/673,480, filed Nov. 9, 2012 Office Action mailed Jan. 16, 2013, 27 pages.

International Preliminary Report on Patentability of PCT/US2011/059977 mailed on Jun. 6, 2013, 6 pages.

International Preliminary Report on Patentability of PCT/US2011/068161 mailed on Jul. 25, 2013, 13 pages.

International Preliminary Report on Patentability of PCT/US2012/025502 mailed Sep. 6, 2013, 9 pages.

Liu, Yue et al., "Recognition of QR code with mobile phones," Control and Decision Conference, 2008. CCDC 2008. Jul. 2-4, 2008, pp. 203, 206.

U.S. Appl. No. 12/964,478, filed Dec. 9, 2010, Final Office Action mailed Sep. 16, 2013, 12 pages.

U.S. Appl. No. 12/961,369, filed Dec. 6, 2010, Non-Final Office Action mailed Mar. 25, 2013, 17 pages.

U.S. Appl. No. 12/961,369, filed Dec. 6, 2010, Non-Final Office Action mailed Jul. 12, 2013, 22 pages.

U.S. Appl. No. 12/971,349, filed Dec. 7, 2010, Notice of Allowance mailed Oct. 2, 2013, 24 pages.

U.S. Appl. No. 12/981,244, filed Dec. 29, 2010, Final Office Action mailed Oct. 30, 2013, 10 pages.

U.S. Appl. No. 13/016,483, filed Jan. 28, 2011 Final Office Action mailed Jun. 27, 2013, 13 pages.

U.S. Appl. No. 12/965,645, filed Dec. 10, 2010, Non-Final Office Action, mailed Jul. 19, 2013, 20 pages.

U.S. Appl. No. 12/973,431, filed Dec. 20, 2010, Final Office Action mailed Aug. 27, 2013, 11 pages.

U.S. Appl. No. 13/006,270, filed Jan. 13, 2011, Non-Final Office Action mailed Oct. 8, 2013, 20 pages.

U.S. Appl. No. 13/028,030, filed Feb. 15, 2011, Non-Final Office Action mailed Dec. 17, 2013, 60 pages.

U.S. Appl. No. 13/035,525, filed Feb. 25, 2011, Final Office Action mailed Sep. 12, 2013, 21 pages.

U.S. Appl. No. 13/037,302, filed Feb. 28, 2011 Final Office Action mailed Oct. 16, 2013, 28 pages.

U.S. Appl. No. 13/037,316, filed Feb. 28, 2011, Final Office Action mailed Aug. 28, 2013, 13 pages.

U.S. Appl. No. 13/192,287, filed Jul. 27, 2011 Non Final Office Action mailed Jun. 13, 2013, 22 pages.

U.S. Appl. No. 13/673,480, filed Nov. 9, 2012 Final Office Action mailed Sep. 9, 2013, 10 pages.

U.S. Appl. No. 13/673,480, filed Nov. 9, 2012 Notice of Allowance mailed Nov. 12, 2013, 16 pages.

U.S. Appl. No. 13/475,794, filed May 18, 2012 Non-Final Office Action mailed Sep. 18, 2013, 19 pages.

U.S. Appl. No. 12/961,369, filed Dec. 6, 2010, Non-Final Office Action mailed Feb. 13, 2014, 21 pages.

U.S. Appl. No. 13/010,557, filed Jan. 20, 2011, Final Rejection mailed Jan. 16, 2014, 17 pages.

U.S. Appl. No. 13/010,557, filed Jan. 20, 2011, Non-Final Rejection mailed Aug. 5, 2013, 17 pages.

U.S. Appl. No. 13/192,287, filed Jul. 27, 2011, Final Office Action mailed Jan. 28, 2014, 18 pages.

U.S. Appl. No. 13/035,474, filed Feb. 25, 2011, Non Final Rejection mailed Mar. 6, 2014, 20 pages.

U.S. Appl. No. 13/968,611, filed Aug. 16, 2013, Non-Final Office Action mailed Jan. 17, 2014, 21 pages.

U.S. Appl. No. 12/964,478, filed Dec. 9, 2010, Non-Final Office Action mailed Mar. 26, 2013, 19 pages.

U.S. Appl. No. 12/953,227, filed Nov. 23, 2010, Final Office Action mailed May 24, 2013, 17 pages.

U.S. Appl. No. 12/973,431, filed Dec. 20, 2010, Non-Final Rejection mailed May 15, 2013, 30 pages.

U.S. Appl. No. 13/014,591, Notice of Allowance mailed May 24, 2013, 32 pages.

U.S. Appl. No. 13/007,317, Notice of Allowance mailed May 13, 2013, 16 pages.

(56) References Cited

OTHER PUBLICATIONS

U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 13/035,525, filed Feb. 25, 2011, Non-Final Office Action mailed May 15, 2013, 15 pages.
Extended European Search Report for EP 11842890.3 dated Mar. 26, 2014, 8 pages.
Extended European Search Report for EP 11850819.1 dated Mar. 17, 2014, 5 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2012/048032 mailed on Apr. 3, 2014, 6 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8 pp. 8, XP031887368, DOI: 10.1109/MTAS.2005.207166; ISBN: 978-981-5-4573-4, 8 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action dated Jun. 23, 2014 for European Patent Application No. 12719817.4 issued in the corresponding foreign application, 5 pages.
U.S. Appl. No. 14/179,336, filed Feb. 12, 2014 Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Final Office Action, mailed Mar. 18, 2014, 24 pages.
U.S. Appl. No. 12/965,645, filed Dec. 10, 2010, Notice of Allowance, mailed Jun. 20, 2014, 35 pages.
U.S. Appl. No. 13/028,030, filed Feb. 15, 2011, Final Office Action mailed Jul. 11, 2014, 43 pages.
U.S. Appl. No. 13/006,270, filed Jan. 13, 2011, Final Office Action mailed May 9, 2014, 41 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Notice of Allowance mailed May 2, 2014, 40 pages.
Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
First Office Action by the Mexican Institute of Industrial Property for Mexican Patent Application No. MX/a/2013/00988 (94567-886740), dated Aug. 14, 2014, 3 pages.
International Preliminary Report on Patentability for PCT/US2011/060002 mailed Jun. 6, 2013, 6 pages.
International Preliminary Report of Patentability for PCT/US2011/060094 mailed Jun. 20, 2013, 6 pages.
International Preliminary Report on Patentability for PCT/US2011/060121 mailed Jun. 20, 2013, 6 pages.
International Preliminary Report on Patentability for PCT/US2011/061211 mailed Jul. 4, 2013, 7 pages.
International Preliminary Report on Patentability for PCT/US2011/061773 mailed Jun. 6, 2013, 6 pages.
International Preliminary Report on Patentability for PCT/US2011/061778 mailed Jul. 11, 2013, 6 pages.
International Preliminary Report on Patentability for PCT/US2011/060098 mailed Jun. 13, 2013, 9 pages.
International Preliminary Report on Patentability for PCT/US2011/063308 mailed Jul. 18, 2013, 9 pages.
International Preliminary Report on Patentability for PCT/SU2012/022581 mailed Aug. 8, 2013, 12 pages.
International Preliminary Report on Patentability for PCT/US2012/022405 mailed Aug. 8, 2013, 7 pages.
International Preliminary Report on Patentability for PCT/US2012/024923 mailed Aug. 29, 2013, 8 pages.
International Preliminary Report on Patentability for PCT/US2012/024956 mailed Aug. 29, 2013, 7 pages.
International Preliminary Report on Patentability for PCT/US2012/025607 mailed Sep. 12, 2013, 8 pages.
International Preliminary Report on Patentability for PCT/US2012/025634 mailed Sep. 6, 2013, 5 pages.
International Preliminary Report on Patentability for PCT/US2012/026373 mailed Sep. 12, 2013, 10 pages.
International Preliminary Report on Patentability for PCT/US2012/026624 mailed Sep. 12, 2013, 12 pages.
International Preliminary Report on Patentability for PCT/US2011/060109 mailed Jun. 20, 2013, 7 pages.
Office Action of the Intellectual Property Office for ROC Patent App. No. 101101486, dated Aug. 5, 2014, 4 pages.
The First Office Action for Mexican Patent Application No. MX/a/2013/006262 is not translated into English. This document is from prosecution of the corresponding foreign matter for which we do not have a translation. Dated Aug. 7, 2014, 2 pages.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
U.S. Appl. No. 13/034,482, filed Feb. 24, 2011 Notice of Allowance mailed Aug. 29, 2014, 45 pages.
U.S. Appl. No. 13/035,474, filed Feb. 25, 2011 Final Rejection mailed Aug. 27, 2014, 38 pages.
U.S. Appl. No. 13/006,270, filed Jan. 13, 2011 Non-Final Office Action mailed Sep. 12, 2014, 41 pages.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action dated Feb. 18, 2015 for Mexican Patent Application No. MX/a/2013/009794, 1 page.
Office Action and Search Report for ROC (Taiwan) Patent Application No. 100149344 issued Jan. 23, 2015, 8 pages.
Office Action for European Patent Application No. 12707435.9 dated Mar. 12, 2015, 6 pages.
U.S. Appl. No. 12/953,227, filed Nov. 23, 2010, Non Final Office action mailed Mar. 24, 2015, 39 pages.
U.S. Appl. No. 13/006,270, filed Jan. 13, 2011, Final Office Action mailed Mar. 23, 2014, 51 pages.
International Preliminary Report on Patentability of PCT/US2011/063111 mailed Jun. 13, 2013, 8 pages.
The First Office Action dated Nov. 12, 2014 for Mexican Patent Application No. MX/a/2013/009794 is not translated into English, 2 pages.
Office Action dated Jan. 28, 2015 for Mexican Patent Application No. MX/a/2013/006973 is not translated into English, 3 pages.
Office Action dated Dec. 5, 2014 for Mexican Patent Application No. MX/a/2013/009882 is not translated into English, 1 page.
European Search Report for EP 11844504 dated Feb. 24, 2015, 10 pages.
First Examination Report from European Patent Office dated Feb. 4, 2015 for EP 12716751.8, 4 pages.
Office Action from European Patent Office for Application No. 12716728.6 dated Feb. 26, 2015, 4 pages.
U.S. Appl. No. 14/179,336, filed Feb. 12, 2014 Notice of Allowance mailed Feb. 18, 2015, 15 pages.
U.S. Appl. No. 13/035,474, filed Feb. 25, 2011 Non Final Rejection mailed Feb. 17, 2015, 57 pages.

(56) References Cited

OTHER PUBLICATIONS

U.S. Appl. No. 13/028,030, filed Feb. 15,2011, Non-Final Office Action mailed Feb. 6, 2015, 56 pages.
U.S. Appl. No. 13/302,717, filed Nov. 22, 2011, Non-Final Rejection mailed Dec. 18, 2014, 71 pages.
U.S. Appl. No. 12/973,431, filed Dec. 20, 2010, Non-Final Rejection mailed Dec. 19, 2014, 30 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
The First Office Action for Mexican Patent Application No. MX/a/2013/007672 is not translated into English. This document is from prosecution of the corresponding foreign matter for which we do not have a translation. Dated Sep. 11, 2014, 2 pages.
U.S. Appl. No. 14/179,336, filed Feb. 12, 2014, Final Office Action mailed Dec. 1, 2014, 30 pages.
U.S. Appl. No. 13/016,483, filed Jan. 28, 2011, Non-Final Office Action mailed Nov. 3, 2014, 33 pages.
U.S. Appl. No. 13/475,794, filed May 18, 2012, Non-Final Office Action mailed Nov. 21, 2014, 33 pages.
First Examination Report from European Patent Office dated May 18, 2015 for EP 11849496.2, 7 pages.
European Office Action for EP 11842890.3 dated Mar. 13, 2015, 8 pages.
European Search Report for EP 11855065 dated Mar. 6, 2014, 6 pages.
Office Action for EP 11855065 dated Mar. 13, 2015, 6 pages.
Notice of Allowance by the Mexican Institute of Industrial Property for Mexican Patent Application No. MX/a/2013/009881 dated Jan. 12, 2015, 1 page.
First Office Action for CN 201180065044.7 issued Feb. 13, 2015 by the State Intellectual Property Office, 4 pages.
U.S. Appl. No. 13/475,794, filed May 18, 2012 Final Office Action mailed Jun. 1, 2015, 45 pages.
U.S. Appl. No. 13/302,717, filed Nov. 22, 2011 Final Rejection mailed May 8, 2015, 44 pages.
U.S. Appl. No. 13/037,302, filed Feb. 28, 2011, Final Office Action mailed May 4, 2015, 54 pages.
U.S. Appl. No. 13/016,483, filed Jan. 28, 2011 Final Office Action mailed May 13, 2015, 34 pages.
U.S. Appl. No. 12/973,431, filed Dec. 20, 2010 Notice of Allowance mailed May 28, 2015, 20 pages.
Office Action from European Patent Office for Application No. 11852630.0 dated May 12, 2015, 7 pages.
Office Action from State Intellectual Property Office for CN Appln. No. 201180056242.7, received Jun. 17, 2015, 10 pages.
Office Action dated Apr. 22, 2015 for Mexican Patent Application No. MX/a/2013/009883, 2 pages.
U.S. Appl. No. 13/028,030, filed Feb. 15,2011, Final Office Action mailed Jul. 17, 2015, 63 pages.
Notice of Allowance and search report for ROC (Taiwan) Patent Application No. 101106288 received May 29, 2015, 9 pages.
The Second Office Action dated Jun. 1, 2015 for Mexican Patent Application No. MX/a/2013/007672 is not translated into English, 2 pages.
The First Office Action dated Jul. 13, 2015 for Mexican Patent Application No. MX/a/2013/009791 is not translated into English, 2 pages.
Office Action and Search Report from the State Intellectual Property Office for CN Pat. Appln. No. 201180066584.7 issued on Jul. 10, 2015, 12 pages.
U.S. Appl. No. 13/035,474, filed Feb. 25, 2011 Non Final Rejection mailed Sep. 11, 2015, 65 pages.
U.S. Appl. No. 13/864,474, filed Apr. 17, 2013 Non Final Office Action mailed Aug. 11, 2015, 59 pages.
Second Office Action for CN 201180065044.7 issued Sep. 9, 2015 by the State Intellectual Property Office (SIPO), 20 pages.
U.S. Appl. No. 12/953,227, filed Nov. 23, 2010, Final Office Action mailed Nov. 6, 2015, 26 pages.

\* cited by examiner

PROVISION OF ALTERNATE CONTENT IN RESPONSE TO QR CODE

TECHNICAL FIELD

The technology described herein relates to the provision of information, media, or other content related to information encoded in quick response (QR) codes.

BACKGROUND

A quick response (QR) code is a matrix barcode (or two-dimensional code), readable by QR scanners, mobile phones with a camera, and smartphones. The code consists of black modules arranged in a square pattern on white background. The information encoded can be text, uniform resource indicator (URI), or other data. Although initially used for tracking parts in manufacturing processes, QR Codes are now used in a much broader context, including both commercial tracking applications and convenience-oriented applications aimed at mobile phone users (known as mobile tagging). QR codes can be used to display text to the user, to add a contact's information to the user's device, to open a URI, or to compose a text message or email. Users can also generate and print their own QR code for others to scan and use by visiting one of several free QR code generating sites. QR codes storing addresses and URIs may appear in magazines, on signs, buses, business cards, or on just about any object about which users might desire information. Users with a camera phone or other mobile device equipped with the correct reader application can convert a photographic image of the QR code to display text, contact information, connect to a wireless network, or open a web page in the phone's browser.

The information included in this Background section of the specification, including any references cited herein and any description or discussion thereof, is included for technical reference purposes only and is not to be regarded subject matter by which the scope of the invention is to be bound.

SUMMARY

The technology disclosed herein is provided to allow a party that is not the source or originator of a QR code to still provide a consumer a selection of related alternate content rather than content possibly identified in the QR code. In one implementation, a method is implemented on a computer system to receive additional content information represented by a QR code extracted by a QR reader device from a media presentation containing the QR code. The QR code is generated by a source of the media presentation. A location of alternate content from a captive environment related to the additional content information is identified. The location of the alternate content may be identified based upon the decoded information from the QR code. Finally, the location of the alternate content is transmitted to the QR reader device.

In another implementation, a method is implemented on a computer system wherein a QR code corresponding to a location identifier for additional content stored within a captive environment is generated and the additional content is related to a media presentation created by a third party source. The QR code is transmitted in conjunction with a transmission of the media presentation. Finally, when a request for the additional content is received from a consumer device, the additional content is transmitted to the consumer device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

DETAILED DESCRIPTION

In the context of the growing use of quick response (QR) codes to provide consumers additional, value added information, it may be desirable to provide consumers information and content related to a media presentation that the consumer is viewing, even if the party desiring to provide information in response to a QR code is not the originator of the QR code in the media presentation. For example, a television broadcast may include a commercial advertisement that includes a QR code that a consumer can capture and use to solicit additional information about the product, service, or event advertised. The QR code is generally created by the sponsor or source of the advertisement, i.e., the company or other entity selling the product, service, or event. However, the network broadcaster, e.g., the cable or satellite television company; may wish to provide the user with its own alternate, but related content. Such alternate content might be, for example, a web page or a link thereto with community notice about an automobile show in response to an automobile advertisement, an opportunity to easily program a digital video recorder to record an advertised program or movie; information about other network programming related to the programming or the information encoded in the QR code, or myriad other types of alternate content. As the broadcaster or other third party that is not the source of the QR code cannot generally change the information encoded in the QR code, a new mechanism is offered in the following description to achieve the goal of allowing a party that is not the originator of a QR code to still provide a consumer a selection of related alternate content.

Figure 1:
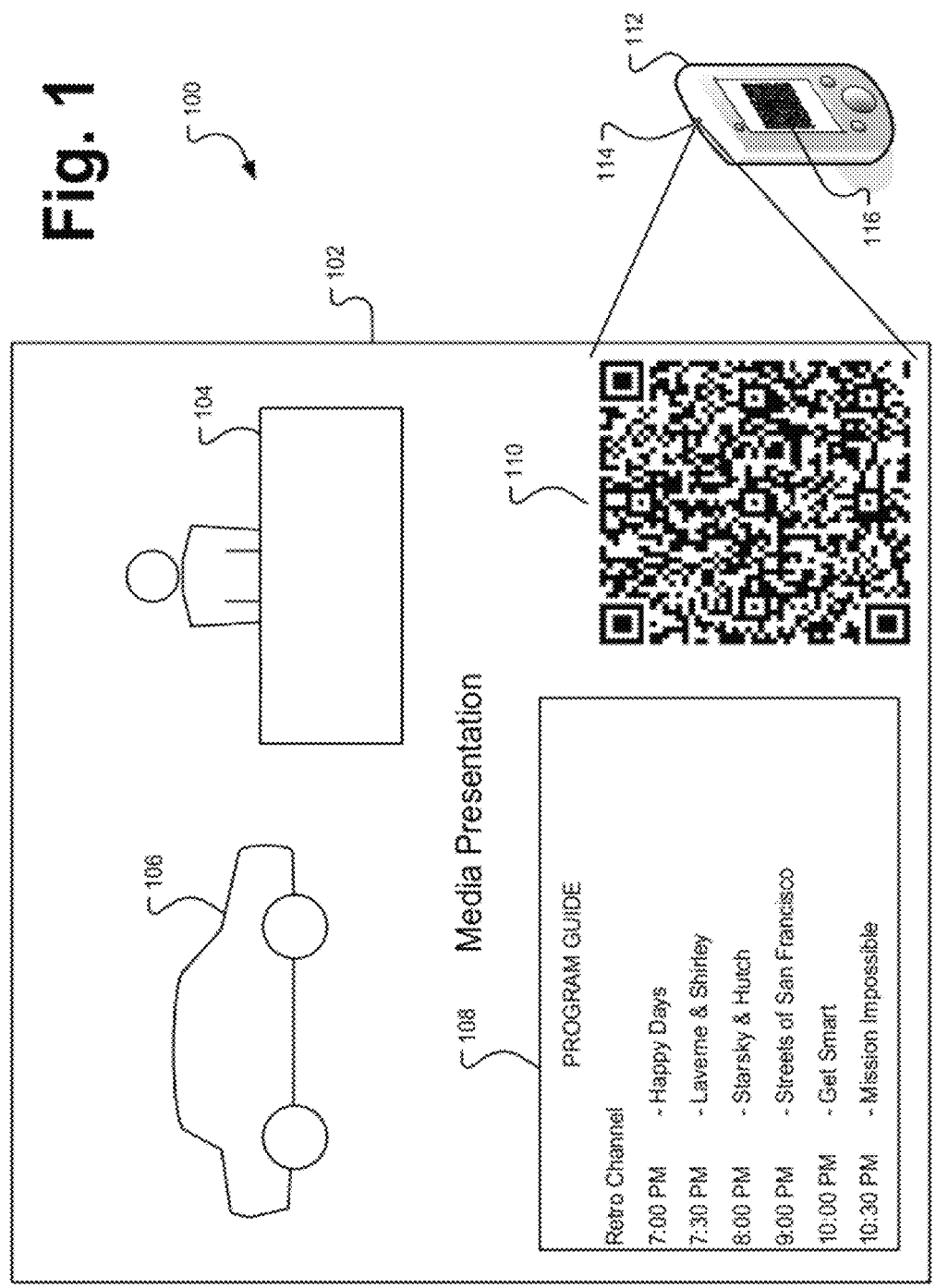
FIG. 1 is schematic diagram of the capture of a QR code as displayed within the context of a media presentation.

A typical system 100 for display and capture of a QR code 110 with in the context of a generic media presentation 102 is presented in FIG. 1. A media presentation 102 may be any type of visual presentation capable of displaying a QR code 110 in conjunction therewith. For example, a media presentation could include presentations on a television, a computer monitor, a projection screen, or in printed form. In the context of a television display, the media presentation 102 may be television programming 104 in the form of a live presentation (e.g., a newscast or sporting event), a pre-recorded program (e.g., a comedy or drama series, movie, an infomercial), an advertisement 106, or possibly a program guide 108 provided by a cable or satellite television broadcaster. Similar types of media presentations 102 may also be displayed on a computer monitor. Further a computer monitor may also display a media presentation 102 in the form of web page displays from websites. It should also be noted that with more recent television capabilities webpage presentations may also be presented on televisions with internet connectivity and appropriate browsing software. A media presentation 102 may also be provided on a projection screen, for example, in the form of a slide show, a theatrical movie release, or a presentation (e.g., using PowerPoint). In printed form a media presentation 102 may take the form of a newspaper or magazine article or advertisement therein, a book, a sign, a billboard, a poster, a sticker, or any other printed form.

Any media presentation 102 may display an associated QR code 110 as a portion of the visual display of the media presentation 102. Often the QR code 110 will be presented as a subsidiary component of the media presentation and placed in a discreet location within the viewable area (e.g., in a corner of the display area). When a QR code 110 is presented in conjunction with a media presentation 102, the QR code 110 typically provides information about content related to the media presentation 102 with which the QR code 110 is associated. In most instances, the QR code 110 is generated by the source of the media presentation 102 to provide further information about the content of media presentation 102 or content related to the media presentation 102 that the source of the media presentation 102 would like to offer to the consumer of the media presentation 102.

Types of information that may be included in a QR code 110 include a name and contact information for the source of the media presentation 102, manufacturing information (e.g., manufacture date, expiration date), pricing information, or other information related to the content of a media presentation. Often information that may be encoded in a QR code 110 includes a uniform resource locator (URL), for example, an address on the world wide web, which would direct a consumer of the media presentation 102 to a website with additional information or content related to the media presentation created by, maintained by, sponsored by, or endorsed by the source of media presentation. The term "source" as used herein with respect to a media presentation is used to refer, for example, to a producer, publisher, or advertiser that actually generates the media presentation as opposed to a broadcast system or network, search engine or platform, other service that merely delivers or provides the source content to a consumer.

In order to access the information QR code 110, a consumer needs a QR code reader device 112. A QR code reader 112 may be a special device with an optical scanner designed to read and decode a QR code 110. More recently, consumer devices with the ability to take a picture may be configured as QR code readers through the implementation of software programs with the ability to recognize QR codes in digital photograph files. Therefore a consumer can use a mobile telephone or smart phone with a built in camera 114 to take a picture of a QR code 110 in a media presentation 102 thereby provide a digital picture 116 for a QR reader software program to decode. Other consumer devices, for example, personal digital assistants, cameras, video recorders, remote control devices, video gaming devices, tablet computers, notebook computers, desktop computers, and other devices may also be configured as QR code readers 112 if they include a component capable of taking a digital picture and software capable of decoding the QR code. Alternatively, combinations of two or more of these devices, e.g., a camera and a desktop computer, could be used together to function as a QR reader by downloading a digital picture of a QR code from the camera to the desktop computer with the appropriate software for decoding the QR code.

Figure 2:
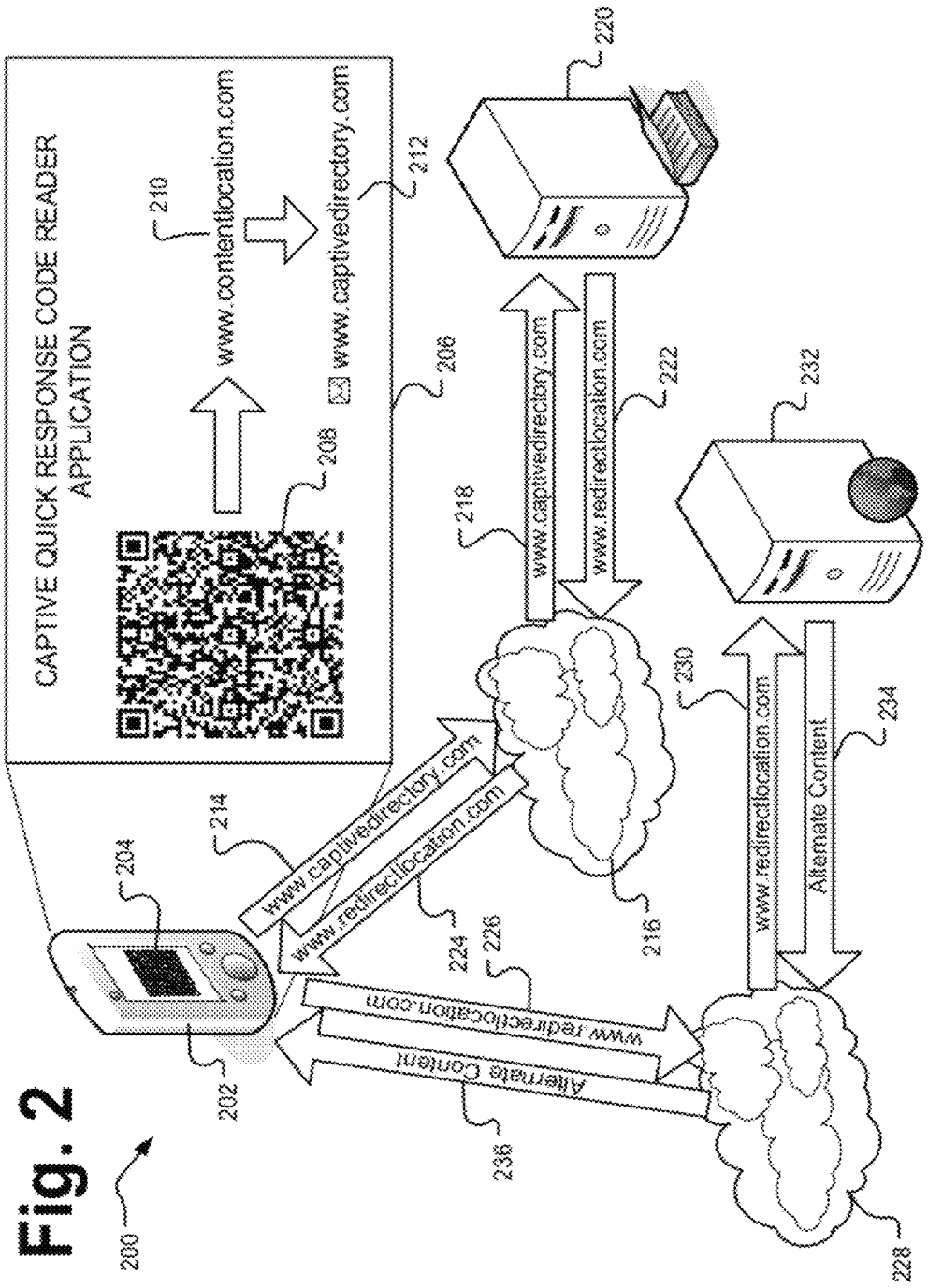
FIG. 2 is schematic diagram of a system for providing alternate content related to the information encoded in a QR code.

A system 200 for providing content to a consumer related to the information provided in a QR code is presented in FIG. 2. In this particular system 200, rather than providing the consumer with information or content developed or provided by the source of the QR code in a media presentation, the system 200 provides alternate related content produced by a third party rather than the source of the media presentation. In one implementation, the system 200 may be understood in the context of a "walled garden" or a "captive environment". A walled garden is an analogy often used in the telecommunications and media industries to refer to a carrier or service provider's control over applications, content, and media presented on a platform and the corresponding restriction of access to non-approved applications, content, or media. In such a walled garden or captive environment, only a closed or exclusive set of information or services may be available to consumers.

In the exemplary implementation of the system 200, a consumer may use a QR code reader device 202 (e.g., a smart phone) to capture a QR code 208, e.g., as a digital photograph 204, from a media presentation. A software application 206 running on the QR reader device 202 may operate to decode the QR code 208. The software application may be a captive QR code reader application 206. The term "captive" in this context is meant to refer to a QR code reader software application 206 as that returns information to the consumer from a walled garden environment rather than providing the consumer the exact information represented in or identified by the QR code 208.

In some implementations, the QR code reader application 206 may be a reader provided by a service provider for the QR reader device 202. For example, if the QR reader device 202 is a mobile phone or a smart phone, a QR reader application 206 may be provided by the phone manufacturer or the network service provider for the phone. Alternatively, a consumer may select a QR code reader software application 206 for operation on the reader device 202 that the consumer knows will return only content from a captive environment, but selects to use such a QR code reader application 206 because the consumer wants to receive only information available through such a captive environment. For example, a consumer that subscribes to a particular satellite or cable television services provider may select a QR response code reader application 206 provided by such a service provider in order to access content prepared by that service provider that is related in some way to the QR code 208 appearing in a media presentation broadcast by the satellite or cable system network.

Continuing with this example, a QR code 208 might be presented in conjunction with an advertisement for a future movie presentation on the network. While the QR code 208 presented by the source of the media presentation (e.g., the film studio distributing the feature film) by using the QR code reader software application 206 provided by the consumer's satellite television network provider, the user may be able to access information about when the film will be presented on the satellite network so that the consumer can schedule to watch or record the presentation on the television network.

Returning to FIG. 2, once the QR code 208 is captured by the QR reader device 202 the QR code reader software application decodes the QR code 208 and identifies the information, e.g., a URL 210, encoded therein. The decoded URL 210 may indicate the location for additional information or content related to the media presentation prepared by the source of the media presentation. In one implementation, the software application 206 may provide a package 212 of the decoded URL 210 along with an address for a captive directory associated with the third party provider of the captive QR code reader software application 206. The software application 206 may then direct the QR reader device 202 to access information stored in a captive directory server 220 maintained by the third party controlling the captive environment. The QR reader device 202 may transmit a request 214 to the captive directory server 224 for the location of the alternate content maintained with the walled garden that is related to the information 210 decoded with the QR code 208.

The transmission request may be carried over a network to 216 that alternately directs the message package 212 to communication link 218 with the captive directory server 220. The network may be a wired or a wireless network or a combination thereof, and may include local area networks, wide area networks, private networks including telephone and cable system networks, and public networks including the Internet. Once the message package 212 reaches the captive directory server 220, the information decoded from the QR code 208 may be processed by the captive directory server 220 to identify alternate content within the walled garden that is related to the information encoded in the QR code 208. In one implementation, the captive directory server 220 may search a database or directory of available alternate content maintained thereon to determine an affinity between the additional content information 210 from the QR code 208 and the available alternate content listed in the directory. In some implementations, the captive directory server 220 may further access the address location found in the additional content information 210 to collect data about the additional content provided by the source of the QR code 208 to inform the affinity information collected in the directory. The captive directory server 220 may select alternate content from the available alternate content indexed in the directory that has the highest affinity with the additional content information 210. The captive directory server 220 may use standard search and affinity algorithms to perform these functions. The captive directory server 220 returns a location identifier associated with the selected alternate content as a location 222.

The captive directory server 220 may then transmit a redirect location 222, e.g., in the form of a URL, over the network 216 and finally return across a direct communication link 224 to the QR reader device 202. The QR reader device 202 may then use the redirect location information and transmit a request 226 across the network 228 to reach a captive content server 232 by communication link 230. The captive content server 232 provides the requested alternate content which is transmitted in a response 234 over the network 228 and returns via communication link 234 to the QR reader device 202 for presentation to the consumer. Through this system, the consumer is thereby presented with alternate content that is related to the QR code 208 captured by the QR reader device 202, but which is content provided by a third party rather than content specifically identified within the QR code 208 by the source of the media presentation.

In an alternate implementation of the system 200, the QR code reader application 206 may access a local database maintained on the QR reader device 202 to identify a location of alternate content and thereby direct the QR reader device 202 to retrieve the alternate content directly from a captive content server 232 and thus bypass the route of first accessing location information for the alternate content from a captive director server 220. In yet a further implementation, the captive directory server 220 may have both directory and captive alternative content information stored thereon. Thus, instead of merely returning location information for the alternate content to the QR reader device, the captive directory server 220 may instead analyze the information in the package 212 provided by the QR code reader application 206 on the QR reader device 202, identify related alternate content stored locally, and transmit the alternate content directly back to the QR reader device 202. In this implementation the need to access a separate captive content server 232 is bypassed.

Figure 3:
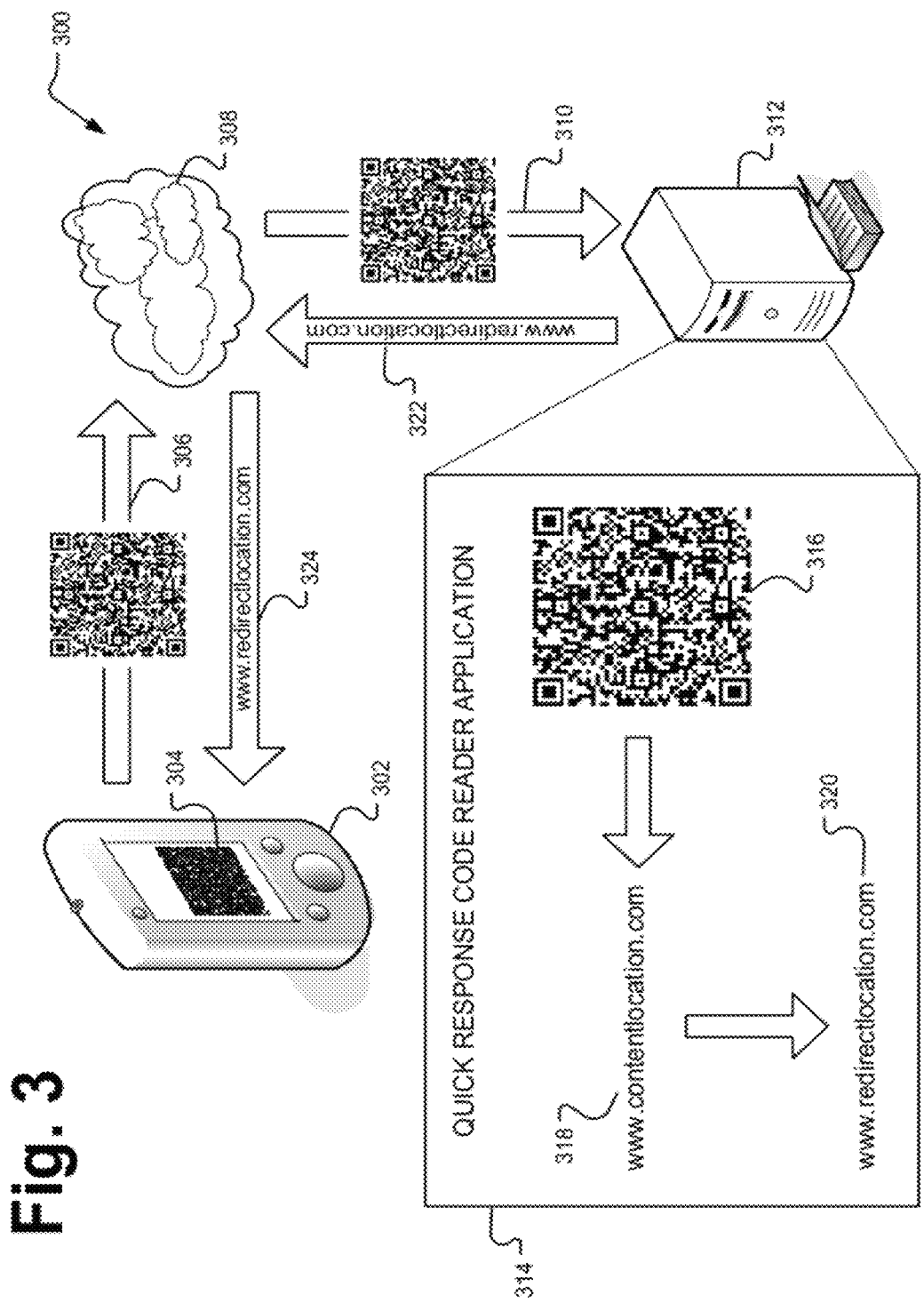
FIG. 3 is a schematic diagram of an alternate system for directing a user device to alternate content associated with information encoded in a QR code.

Another implementation of a system 300 for providing a consumer with alternate content related to a QR code 316 from within a captive environment is presented in FIG. 3. In the system 300, the QR reader device 302 may be able to capture an image 304 of a QR code 316 from a media presentation. However, in this implementation the QR reader device 302 may not be equipped with software capable of decoding the QR code 316 from the image 304. However, the QR reader device 302 may be configured with instructions for recognizing a QR code 316 and transmitting the QR code 316 via transmission request 306 across the network 308 in communication link 310 for receipt at a captive directory server 312. In one implementation of the system 300, the captive directory server 312 is configured with a QR code reader application 314 that identifies the QR code 316 in the message from the QR reader device 302 and decodes the QR code to identify the information 318 (e.g., a URL) contained therein. The captive directory server 312 then processes the decoded information 318 to identify the location of alternate content 320 related to the information 318 represented within the QR code 316. The captive content server 312 then sends a transmission 322 containing a location (e.g., a URL) for accessing the alternate content related to QR code 316. The transmission 322 is carried over the network 308 and returned to the QR reader device via communication link 324. The QR reader device 302 may then use the location address to retrieve the alternate content from within the captive environment in the same manner as shown and described with respect to FIG. 2 and the provision of such information by a captive content server.

Figure 4:
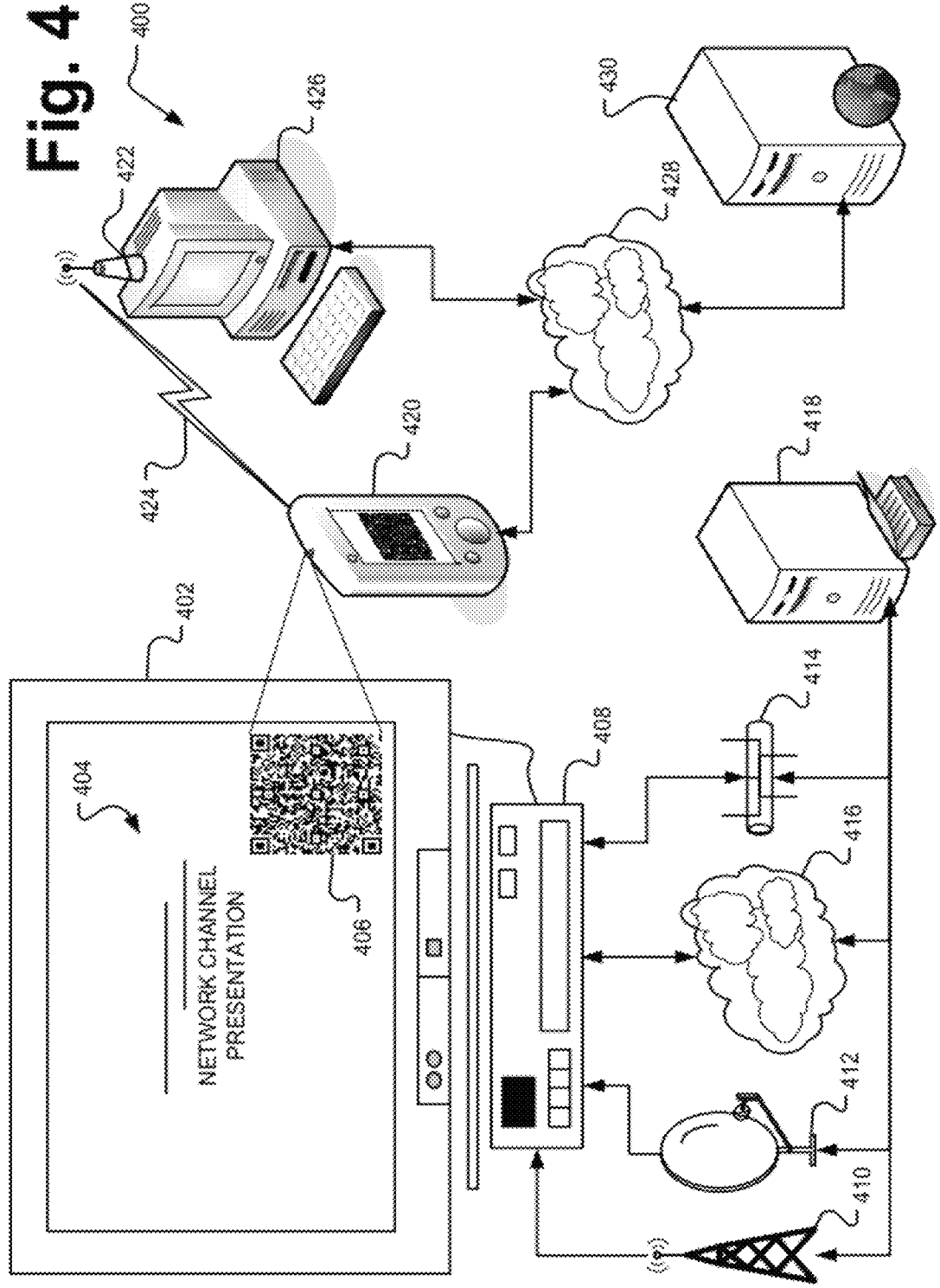
FIG. 4 is a schematic diagram of a system for providing a QR code in conjunction with an audio/video presentation that allows the user to access content related to the presentation.

An alternate environment 400 for presenting alternate content related to a media presentation is presented in FIG. 4. In this implementation, a QR code 406 is presented in conjunction with a network channel presentation 404 on a television 402. The network channel presentation 404 may be any type of programming presented on a television channel at any time. The programming may originate from an over-the-air transmission 410, a satellite television network 412, a cable television network 414, or a streaming or downloaded presentation received over the Internet 416. In some implementations the transmissions may be received directly by the television 402; however, more typically the transmissions will be received by a set top box 408 (e.g., a satellite or cable television box or a digital video recorder) and processed before being transmitted for display on the television 402.

Regardless of the transmission mechanism, the network provider (i.e., the over the air broadcaster 410, the satellite broadcaster 412, the cable system operator 414, or content provider on the internet 416) may insert QR code 406 using a captive directory server 418 located at the broadcast head end (or, for internet content, at the web server). In this implementation, the broadcaster may insert it's own QR code 406 into the transmission. The QR code 406 may be related to the content of the network channel presentation 404 being broadcast. However, the QR code 406 in this embodiment is not provided by the original source of the media presentation. The QR code 406 may thus provide location information that will direct the consumer directly to alternate content in a walled garden potentially related to the network channel presentation 404.

The user may then capture the QR code 406 from the network channel presentation 404 on a QR code reader device 424 (e.g., a telephone, a smart phone, or a remote control). The QR code reader device 424 may then connect via a local network 424 (e.g., a Wi-Fi or Bluetooth network) in communication with a network link 422 (e.g., a wired or wireless router) connected with the consumer's personal computer system 426. The personal computer system 426 may be used by the consumer to access content from a captive environment via network 428 (e.g., the internet) connected to captive content server 430. The content related to the network channel presentation 404 from the captive environment may then be presented to the consumer on the personal computer system 426. Alternatively, if the QR code reader device 420 is capable, it may connect with the captive content server 430 via the network 428 and directly request the related content from the captive environment for presentation to the consumer on the QR code reader device 420 itself.

Figure 5:
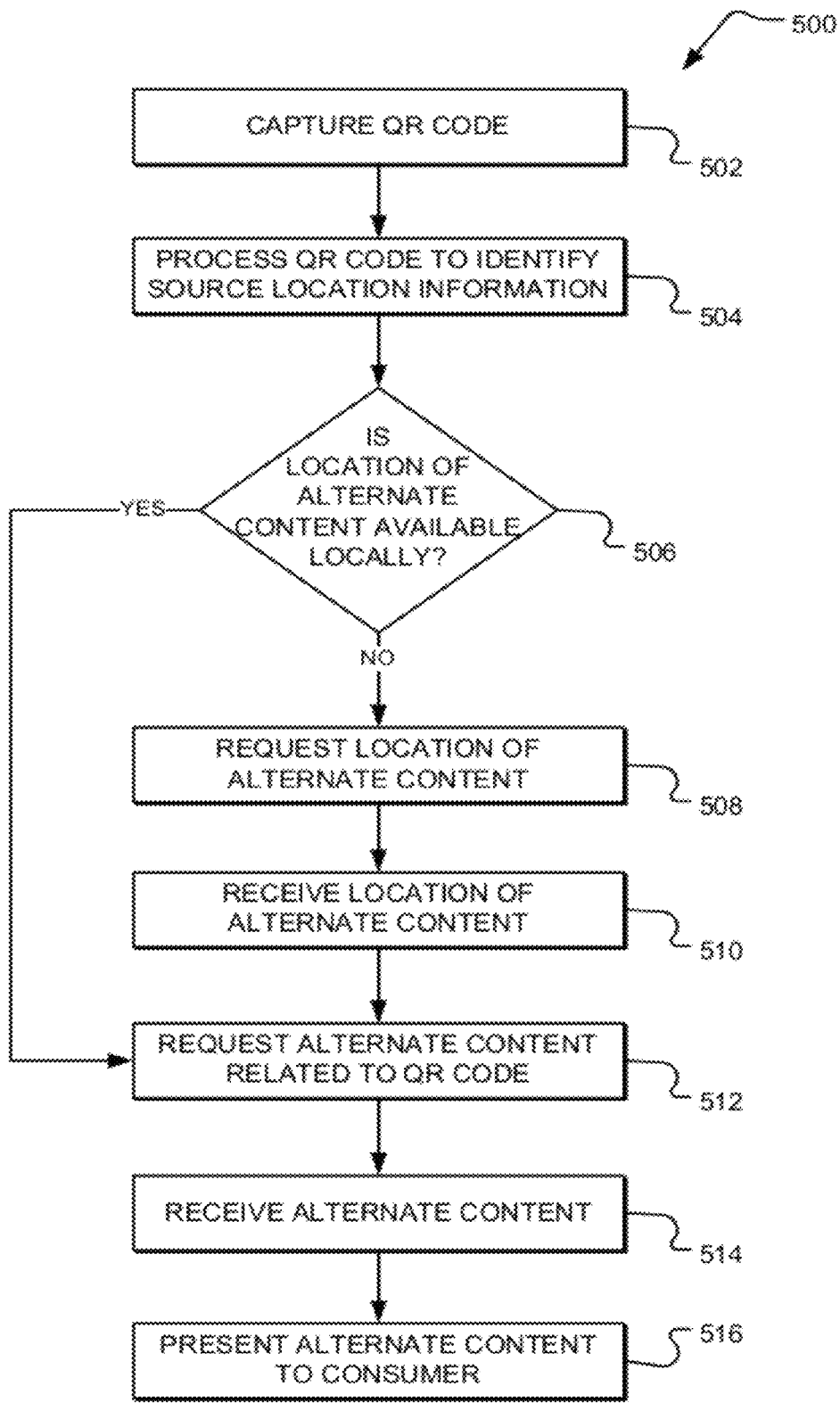
FIG. 5 is a flow diagram of a method for providing identification of alternate content to a consumer device upon receipt of a QR code.

An exemplary method 500 for providing alternate content to a consumer in response the capture of a QR code is presented in FIG. 5. As indicated in initial operation 502, the QR code is captured by a QR code reader device. Next the QR code is processed by the device to identify location information provided by the source of the media presentation as indicated in operation 504. The process may determine whether a location of alternate content is available locally as indicated in query operation 506. If there is no local alternative content location information then the process continues to transmit a request for the location of such alternate content as indicated in operation 508. The QR reader device may then receive the location of the alternate content information, for example, from a captive directory server, as indicated in operation 510. Once the location of the alternate content is known, the process proceeds to request the alternate content related to the QR code as indicated in operation 512. Similarly if in query operation 506 the location of the alternate content was known locally, then the process would skip directly to operation 512 to request the alternate content. Process 500 is then completed when the QR reader device receives the alternate content from a captive environment as indicated in operation 514 and ultimately presents the alternate content to the consumer as indicated in operation 516.

Figure 6:
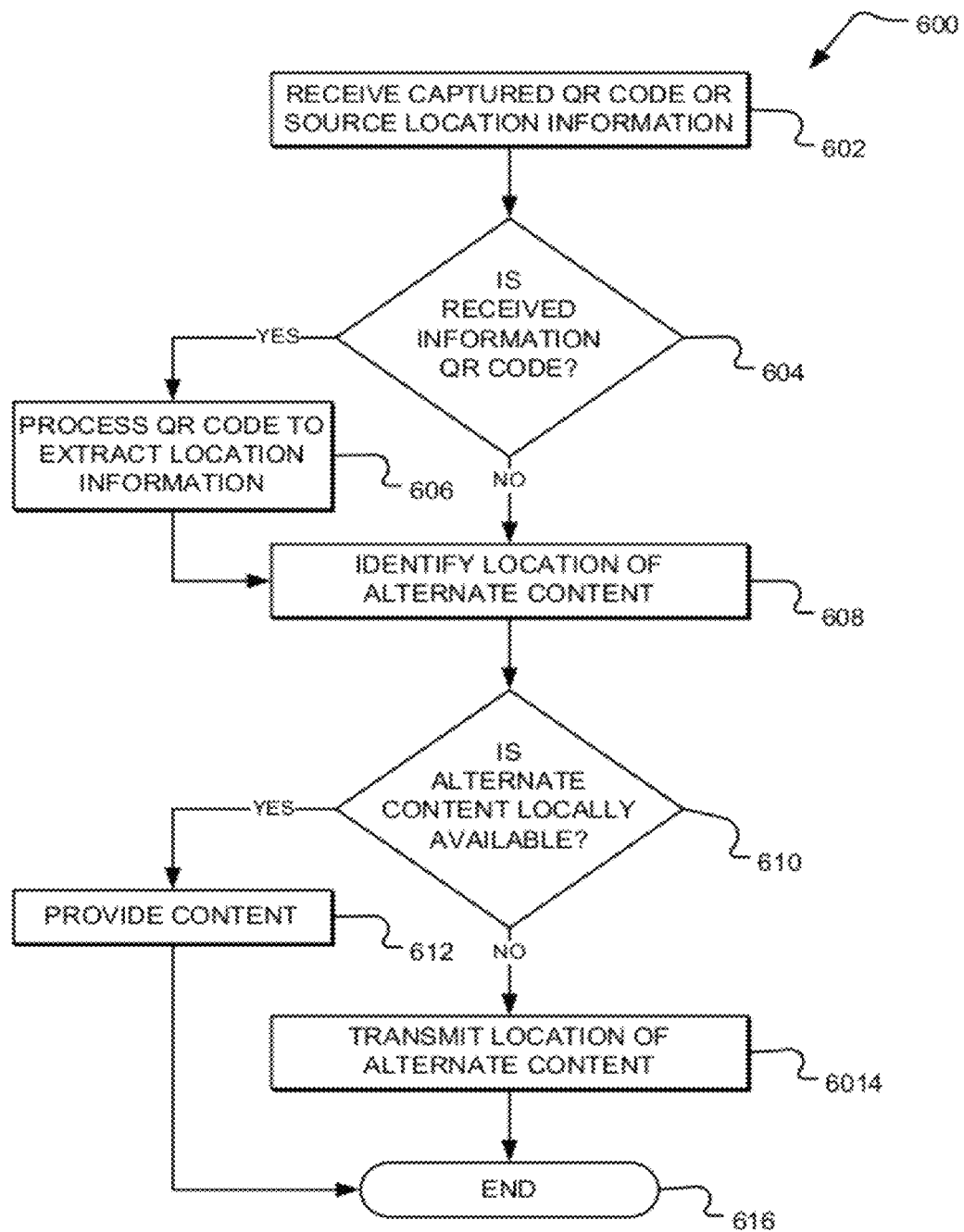
FIG. 6 is a flow diagram of a method for providing non-source content related to source media in response to receipt of a QR code defined by the source of the media or the encoded information therein.

Another process 600 for presenting alternating content to a consumer in receipt of a QR code is presented in FIG. 6. Initially, a captured QR code image, or source location information encoded in a captured QR code image, is received, for example, at a captive directory server as indicated in operation 602. The process 600 may then determine whether a QR code image is received as opposed to decoded location information as indicated in query operation 604. If an actual QR code is received, then the QR code is processed to extract the location information as indicated in operation 606. The process 600 then moves to operation 608. Alternatively, if the QR code image had previously been processed and the location information from the source was provided, the process would move directly from query operation 604 to operation 608. In operation 608, the location of the alternative content within the captive environment is identified. Any determination is then made as to whether the alternate content is available locally as indicated in operation 610. If the alternate content is locally available, the alternate content is transmitted to the consumer device as indicated in operation 612. Afterward, the process 600 ends as indicated in operation 616. Alternatively if it is determined that alternative content is not locally available in query operation 610, then a location of the alternate content is transmitted to the consumer device as indicated in operation 614 and the process terminates as indicated at operation 616.

Figure 7:
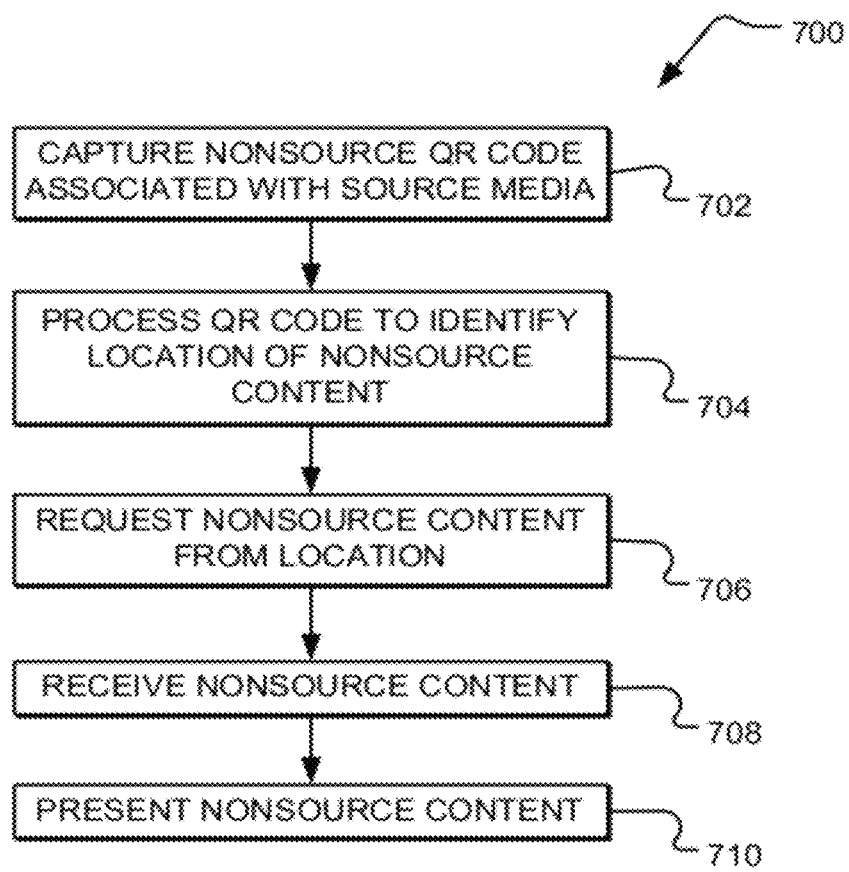
FIG. 7 is a flow diagram of a method for accessing and presenting non-source content related to a QR code presented in source media.

A further process 700 for providing to a consumer walled garden content related to a broadcast presentation is depicted in FIG. 7. In this process 700, a non-source QR code associated with a media presentation is captured as indicated in operation 702. The QR code is then processed to identify the location of available non-source content related to the media presentation as indicated in operation 704. Once the location of the non-source content is identified, a request for the non-source content from the location is made as indicated in operation 706. The non-source content related to the source media presentation is then received as indicated in operation 708. Finally, the non-source content is presented to the consumer as indicated in operation 710.

Figure 8:
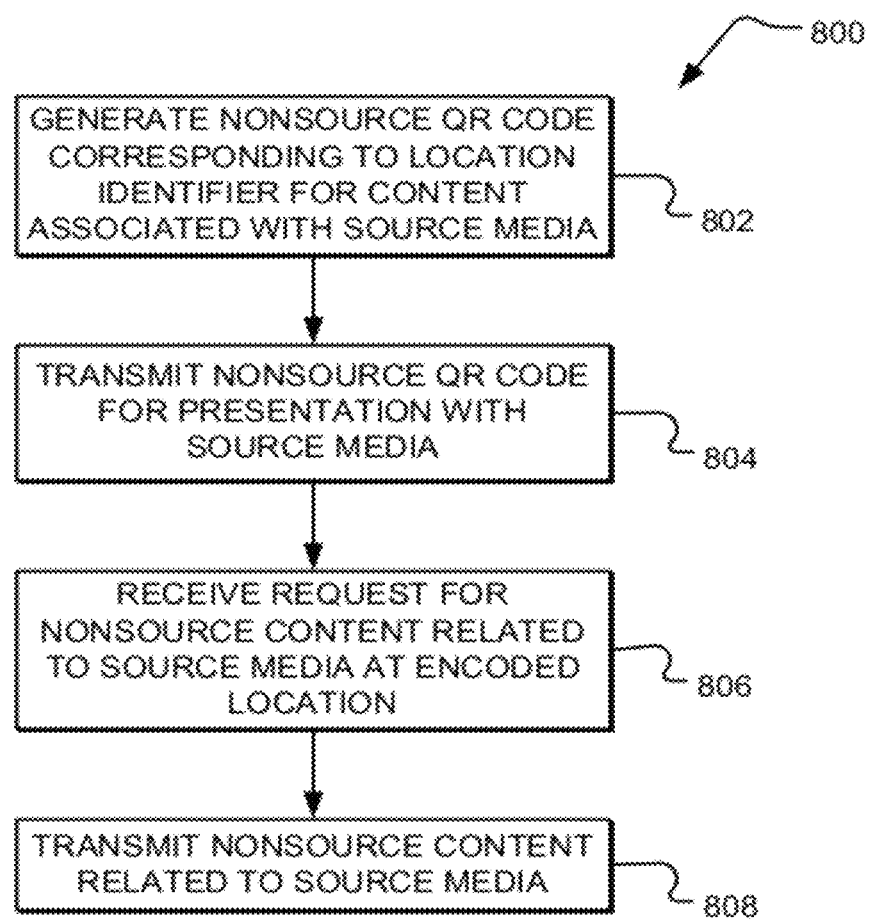
FIG. 8 is a flow diagram of a method for creating a QR code for presentation with source media and transmitting non-source content related to source media in response to a request identifying the QR code or the information therein.

A further process 800 for providing non-source content related to a media presentation from a particular source is presented in FIG. 8. Initially, as indicated in operation 802, a non-source QR code corresponding to a location identifier is generated for providing access to non-source content associated with a media presentation from a particular source. The non-source QR code is transmitted for presentation with the source media as indicated in operation 804. A request may then be received for the non-source content related to the source media at the location identifier encoded within the QR code as indicated in operation 806. Finally, the requested non-source content related to the source media is transmitted to the consumer device for presentation to the consumer as indicated in operation 808.

Many of the devices described herein, for example, the QR code reader devices (in whatever form they may take), the captive directory server, the captive content server, the consumer's personal computer, and others are all computer systems of one form or another. They merely have different processors and memory configurations, are controlled by different operating systems specific to the purpose of the devices, and run different applications in line with their purposes. However, each of these computer systems typically includes at least one processing unit and memories. Depending upon the exact configuration and type of the computer systems, the memories may be volatile (e.g., RAM), non-volatile (e.g., ROM and flash memory), or some combination of both. The most basic configuration of the computer system need include only the processing units and the memory.

The computer systems may further include additional devices for memory storage or retrieval. These devices may be removable storage devices or non-removable storage devices, for example, memory cards, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit. Specific software applications and data fit for the purpose of the particular computer system may be stored on the storage device using any method or technology for storage of data, for example, computer readable instructions, data structures, and program modules.

The computer systems may also have one or more communication interfaces that allow the system to communicate with other devices. The communication interfaces may be connected with a network. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data is generally transmitted to and from the communication interfaces over the network via a modulated data signal, e.g., a carrier wave or other transport medium. A modulated data signal is an electromagnetic signal with characteristics that can be set or changed in such a manner as to encode data within the signal.

The computer system may further have a variety of input devices and output devices. Exemplary input devices may include a keyboard, a mouse, a tablet, and/or a touch screen device. Exemplary output devices may include a display monitor, a printer, and speakers. Such input devices and output devices may be integrated with the computer system or they may be connected to the computer system via wires or wirelessly, e.g., via IEEE 802.11 or Bluetooth protocol. These integrated or peripheral input and output devices are generally well known and are not further discussed herein. Other functions, for example, handling network communication transactions, may be performed by an operating system in the nonvolatile memory of the computer systems.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a computer program storage medium readable by a computer system and encoding a computer program. Another implementation of a computer program product may be provided in a computer data signal embodied in a carrier wave by a computing system and encoding the computer program. It should further be understood that the described technology may be employed in special purpose devices independent of a personal computer.

The above specification, examples and data provide a complete description of the structure and use of exemplary embodiments of the invention as claimed below. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method implemented on a computer system comprising:
   receiving at a first server a first address location from a QR reader device, wherein the first address location is extracted from a QR code contained in a media presentation, wherein the first address location includes additional content related to the media presentation provided by the source of the media presentation;
   accessing the first address location at the first server for the additional content to collect data about the additional content;
   identifying a second address location having alternate content from a captive directory, the alternate content being related to the additional content information based on the collected data about the additional content, wherein the identifying comprises:
      searching a local directory of the first server having available alternate content to determine an affinity between the additional content information and the available alternate content,
      selecting alternate content from the available alternate content having a highest affinity with the additional content information, and
      returning a location identifier associated with the selected alternate content as the location; and
   transmitting the second address location of the alternate content to the QR reader device.

2. The method of claim 1 further comprising
   determining whether the additional content information comprises the QR code and, if so,
   decoding the QR code to aid in the identifying operation.

3. The method of claim 1 further comprising
   determining whether the alternate content related to the QR code information is available locally and, if so,
   transmitting the alternate content to the QR reader device in lieu of transmitting the location.

4. A computer program product comprising computer-executable instructions for performing a computer process stored in a non-transitory storage medium of a mobile device, wherein the instructions comprise operations to:
   receive additional content information contained in a QR code extracted by a QR reader of the mobile device from a media presentation containing the QR code, wherein the QR code is generated by a source of the media presentation, wherein the additional content information comprises a first address location having secondary material related to the media presentation;
   access the first address location from the mobile device to collect data about the secondary material related to the media presentation;
   search a local database of the mobile device for alternate content to be provided in lieu of the first address location;

identify a second address location having alternate content from a captive environment comprising the local database or a captive directory server separate from the mobile device, the alternate content being related to the secondary material related to the media presentation based on the collected data about the secondary material related to the media presentation; and present the alternate content from the second address location.

5. The computer program product of claim 4, wherein the instructions further comprise operations to determine whether the additional content information comprises the QR code and, if so, decode the QR code to aid in the identifying operation.

6. The computer program product of claim 4, wherein the instructions providing the identifying operation further comprise operations to search a directory of available alternate content to determine an affinity between the additional content information and the available alternate content;

select alternate content from the available alternate content having a highest affinity with the additional content information; and return a location identifier associated with the selected alternate content as the location.

7. The computer program product of claim 4, wherein the instructions further comprise operations to determine whether the alternate content related to the QR code information is available locally and, if so, transmit the alternate content to the QR reader device in lieu of transmitting the location.

8. A method implemented on a computer system comprising receiving a television media presentation created by a third party source at a television network provider, wherein the third party source is different from the television network provider;

generating a QR code comprising a location identifier for additional content stored within a captive environment of the television network provider, wherein the additional content is related to the television media presentation created by the third party source, wherein the QR code generation is performed by the television network provider presenting the television media presentation;

transmitting the QR code in conjunction with a transmission of the media presentation from the network provider;

receiving a request for the additional content from a consumer device;

transmitting the additional content to the consumer device.

9. The method of claim 8 further comprising combining the QR code within the media presentation.

10. The method of claim 8, wherein the additional content comprises an address identifier of a location for accessing further additional content.

11. The method of claim 8, wherein the first transmitting operation is incorporated within a streaming media transmission over a telecommunication network.

12. The method of claim 8, wherein the second transmitting operation further comprises transmitting a web page.

13. The method of claim 8, wherein the consumer device is a QR code reader.

14. The method of claim 1, wherein the captive environment comprises a set of information previously collected and indexed as alternate content.

15. The method of claim 14, wherein the captive environment comprises a content server.

16. The method of claim 1, further comprising indexing alternate content in a captive environment based on an affinity with the additional content information.

17. The method of claim 1, wherein the additional content comprises a release date of a feature film, and wherein the alternate content comprises the date on which the film will be presented on a television network.

18. The method of claim 1, wherein the identification further comprises determining that the local directory does not have alternate content with a high enough affinity to the additional content.

19. The method of claim 18, wherein the identification further comprises requesting from a captive directory located on a server separate from the first server alternate content to be provided.

20. The method of claim 19, wherein the request comprises the data collected by the first server from accessing the first address location.

21. The computer program product of claim 4, wherein the operations further include to determine that the local directory does not include alternate content with a high enough affinity, and send a request for alternate content to a server.

* * * * *